Figure 2:
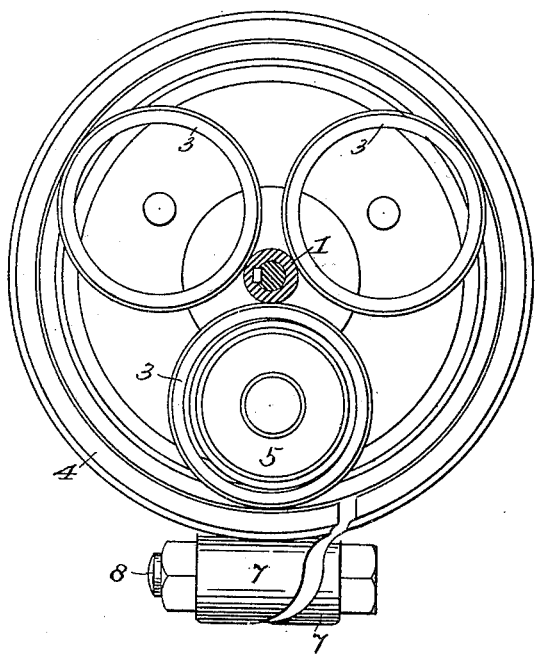

No. 689,003. Patented Dec. 17, 1901.
C. A. & O. W. HULT.
DEVICE FOR ADJUSTING FRICTION GEAR.
(Application filed Apr. 20, 1901.)
(No Model.) 2 Sheets—Sheet 1.
Fig. 1
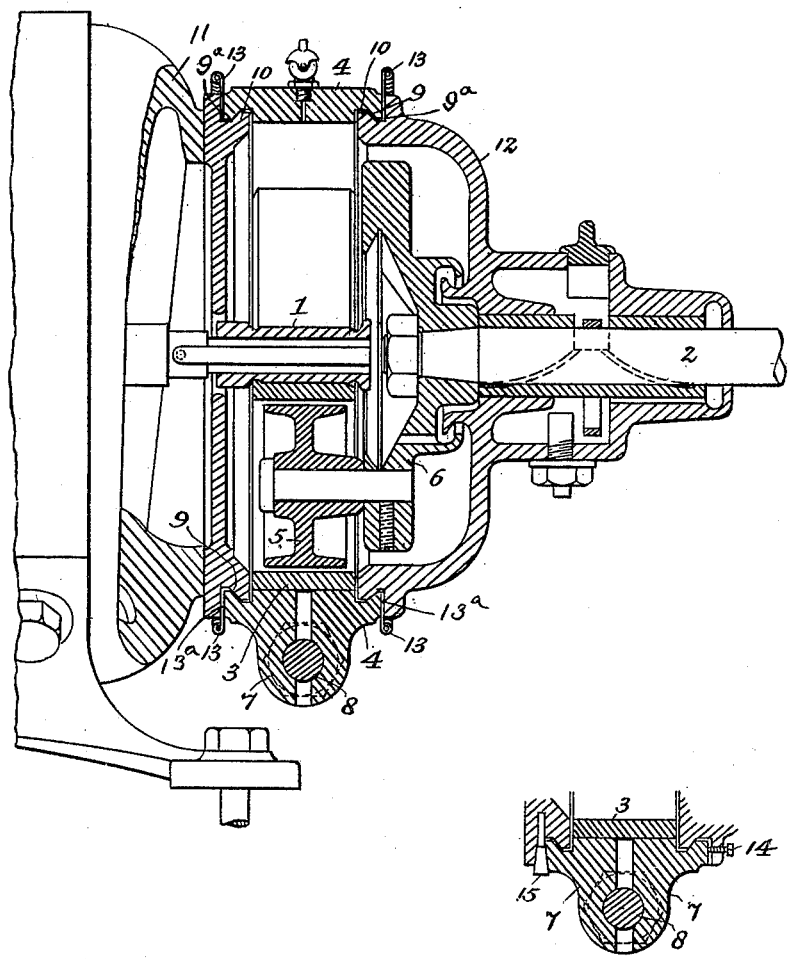
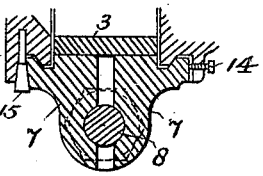
Fig. 4.
Witnesses:
Inventors:
Carl Alrik Hult
Oscar Walfrid Hult
By
their Attorneys.

No. 689,003. Patented Dec. 17, 1901.
C. A. & O. W. HULT.
DEVICE FOR ADJUSTING FRICTION GEAR.
(Application filed Apr. 20, 1901.)

(No Model.) 2 Sheets—Sheet 2.

Witnesses:
E. B. Bolton

Inventors:
Carl Abrik Hult
Oscar Walfrid Hult
By Richard
their Attorneys.

UNITED STATES PATENT OFFICE.

CARL ALRIK HULT AND OSCAR WALFRID HULT, OF STOCKHOLM, SWEDEN.

DEVICE FOR ADJUSTING FRICTION-GEAR.

SPECIFICATION forming part of Letters Patent No. 689,003, dated December 17, 1901.

Application filed April 20, 1901. Serial No. 56,758. (No model.)

*To all whom it may concern:*

Be it known that we, CARL ALRIK HULT and OSCAR WALFRID HULT, directors, subjects of the King of Sweden and Norway, and residents of Stockholm, in the Kingdom of Sweden, have invented certain new and useful Improvements in Devices for Adjusting the Ring-Shaped Guiding-Track of Friction-Gear, (for which we have filed applications for patent in Sweden the 21st day of September, 1900, under No. 1,563; in Italy the 1st day of October, 1900, patent running from December 31, 1900, under No. 132/188; in Great Britain the 1st day of October, 1900, under No. 17,380; in France the 6th day of October, 1900, patent issued January 7, 1901, under No. 304,328; in Belgium the 29th day of September, 1900, patent issued October 15, 1900, under No. 152,314; in Germany the 1st day of October, 1900, under No. H. 24,674, III/47; in Switzerland the 4th day of October, 1900, under No. 25,008; in Austria the 1st day of October, 1900, and in Hungary the 24th day of January, 1901, under No. 1,036,) of which the following is a specification, reference being had therein to the accompanying drawings.

The invention relates to friction-gearing, the object being to effect a ready adjustment of the endless ring-shaped track on which the friction-rolls or friction-rings run, so that the said track while maintaining a position concentric to the central shaft or axis can be increased or decreased in diameter at will and so that the driving and driven shafts will remain accurately in line with each other. This we accomplish by cutting the ring open and providing it with a screw or wedge device connecting its parts, so that the ring can be either expanded or contracted in consequence of the contact-surfaces between the ring and its supports on the framework, between which the ring is located, being made inclined to the radius, the expansion or contraction of the ring being, moreover, compensated so far as the steady holding of the ring is concerned by shifting the said supports axially away from or toward each other and by means of thin intermediate pieces inserted between the support and ring at a sufficient number of points along the circumference, which pieces are designed to be exchanged for thinner or thicker ones, so that the ring or one of the movable supports in adjusting is shifted accurately parallel to itself, and the rectilinear location axially of the ring in relation to the central axis is accurately retained. Adjusting-screws may, however, be substituted for the said intermediate pieces.

Figure 3:
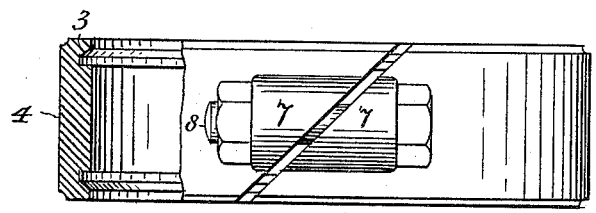

Figure 1 is a section of our friction-gear as applied to an electric motor. Fig. 2 is a transverse sectional elevation of the same from one side. Fig. 3 is an edge view of the ring, partially in section; and Fig. 4 is a section of a detail.

By means of the friction-gear motion is transmitted from the motor-shaft 1 to the shaft 2, located coaxially with the motor-shaft and driven by it so as to rotate at a lower velocity. The friction-gear consists of the rings 3, the ring 4, embracing them and forming the ring-shaped track mentioned above, and a roller 5 within the rings, which roller is attached to the disk 6, rigidly secured to the shaft 2. The rings 3, which are revolved by the shaft 1, run around the ring 4 and in so doing move the disk 6 with them by means of the roller 5. The ring 3 can, if required, be dispensed with and the roller 5 made to bear on the shaft 1 and ring 4. The ring 4 is split and provided at its ends with lugs 7, through which passes a screw 8. By means of the latter the ring can be expanded or contracted. In place of a screw we may employ a wedge device or the like. The ring is split obliquely, as shown in Fig. 3, so as to avoid any interruption in the rolling track. The split can also be made of zigzag form across the ring or of other suitable form. Close to its two edges the ring 4 is provided with circumferential turned grooves, the outer sides 9 of which are inclined at an angle of forty-five degrees to the sides of the ring. With the said grooves engage flanges provided with correspondingly-inclined sides 10, the flange situated at one side of the inner ring 4 being formed on the ring or head 11 of the frame or drum and the flange on the other side of the ring 4 being formed on the outer head 12. The head 11 is secured to the machine by means of screws. (Not shown in the drawings.) The said heads each have a groove or slot 9ª, in which engages the edge of the ring 4, which is outside the annular groove, a small space 13ª being provided between the end surface of the ring and the opposite side of the head-groove and the said surface and side being perpendicular, or nearly so, to the axis of the ring. In the said space intermediate strips or pieces 13 are placed at three points at least of the circumference. If the two heads 11 and 12 are removed to a greater distance from each other axially by placing intermediate pieces 13 of suitable thickness between the end surfaces of the ring and the supports, the inclined surfaces 9 and 10 will be moved toward each other, so that the diameter of the ring is increased and the ring or outer track and supports will exactly adjust themselves in a concentric and rectilinear position in the axial direction, provided that the intermediate pieces are of equal thickness. By setting up the screw 8 the ring is tightened, so as to firmly embrace the supports. If the intermediate pieces be exchanged for others which are thinner and if the screw be tightened, the supports will be moved closer together and the ring will be diminished in diameter. In this manner the pressure or tension on the friction rings or rolls can obviously be readily adjusted to the desired extent to suit the power to be transmitted and take up any wear of the friction-surfaces that may take place. At the same time the parts 12 4 11, forming a drum or casing for the friction-gear, become united to each other and secured in a simple manner to the machine (which in the drawings is an electric motor) to which the gear is applied, without the use of bolts or the like. The inclination of the surfaces 9 and 10 can obviously be different from that shown in the drawings, though forty-five degrees appears to be the most suitable, inasmuch as with this taper it is only necessary without detaching the friction-gear and for a given desired tension to employ intermediate pieces of a thickness of one-half the desired increase in diameter of the ring.

Fig. 4 shows how adjusting-bolts may be substituted for the intermediate pieces. These may be inserted from the side through the head or support, as indicated at 14 in said figure, or between the support and the ring, as shown at 15. In the latter case the screw is conical in shape at the top, so that when being screwed in it acts like a wedge and moves the ring and support away from each other.

Having now described our invention, what we claim, and desire to secure by Letters Patent, is—

In an internal friction-gear, in combination, a split cylindrical ring, rollers rotating within and against the said ring, a ring-shaped bottom at either side of the ring, the latter embracing the said bottoms, grooves at the inner side of the ring, flanges at the ring-shaped bottoms engaging the said grooves, correspondingly-inclined sides of the said grooves and flanges slanting toward the axis of the ring, space-pieces placed between the ends of the ring and adjacent parts of the bottoms, and a screw for adjusting the diameter of the ring according to the thickness of the space-pieces, the ring being supported at its inner side by the conical flanges of the bottom, substantially as described.

In witness whereof we have hereunto signed our names in the presence of two subscribing witnesses.

CARL ALRIK HULT.
OSCAR WALFRID HULT.

Witnesses:
  MILDRED I. WELCH,
  M. KIRKMAN LOWERRE.